Sept. 20, 1960 J. V. McNULTY 2,953,623

FORCED CONVECTION COOLING FOR ISOLATED PHASE BUS

Filed Dec. 13, 1956 4 Sheets-Sheet 1

INVENTOR.
JOSEPH V. McNULTY
BY Ostrolenk, Faber, Gerb & Soffen
ATTORNEYS

Sept. 20, 1960 J. V. McNULTY 2,953,623

FORCED CONVECTION COOLING FOR ISOLATED PHASE BUS

Filed Dec. 13, 1956 4 Sheets-Sheet 2

INVENTOR.
JOSEPH V. McNULTY

BY Ostrolenk, Faber, Gerb & Soffen
ATTORNEYS

FORCED CONVECTION COOLING FOR ISOLATED PHASE BUS

Filed Dec. 13, 1956 4 Sheets-Sheet 3

INVENTOR.
JOSEPH V. McNULTY
BY Ostrolenk Faber, Gerb & Soffen
ATTORNEYS

Sept. 20, 1960 J. V. McNULTY 2,953,623

FORCED CONVECTION COOLING FOR ISOLATED PHASE BUS

Filed Dec. 13, 1956 4 Sheets-Sheet 4

INVENTOR.
JOSEPH V. McNULTY

BY Ostrolenk, Faber, Gerb & Soffen
ATTORNEYS

United States Patent Office 2,953,623
Patented Sept. 20, 1960

2,953,623

FORCED CONVECTION COOLING FOR ISOLATED PHASE BUS

Joseph V. McNulty, Norristown, Pa., assignor to I-T-E Circuit Breaker Company, Philadelphia, Pa., a corporation of Pennsylvania Filed Dec. 13, 1956, Ser. No. 628,097

5 Claims. (Cl. 174—16)

My invention relates to an arrangement for cooling conductors of an isolated phase bus and more particularly to a forced convection cooling arrangement.

In an isolated phase bus system the electrical conductors of the phases are each confined within separate housings, with the outside of the conductors being spaced from their respective housings so that an air space of considerable thickness is formed between the conductor and housing. As current is passed through the conductors they begin to heat up because of $I^2R$ losses within the conductors. As the temperature rises so does the resistance of the conductor material.

This rising resistance increases the IR or potential drop of the line thus lowering the voltage to the load and also increases the $I^2R$ or power loss which in turn generates more heat. The increased heat causes the conductors to expand setting up mechanical stresses and in extreme cases the conductors themselves have been known to melt.

Heat is transferred from the bus conductor by convection and to a much lesser degree by radiation. However, the convection cooling process is impeded by the fact that the space between the conductor and housing is filled with dead air which tends to act as a thermal insulating barrier.

The heating problem may be alleviated by increasing the size of the conductors which would reduce the resistance and increase the radiating surfaces. But the cost of copper or other good electrical conductors is quite high and larger conductors would require larger housings thus increasing the size and weight of the installation to the point where fabrication and installation present major problems. This is more fully explained in copending application Serial No. 353,301, filed May 6, 1953 to Collonge, entitled Forced Cooled Bus and assigned to the assignee of the instant invention now U.S. Patent 2,861,119 issued November 18, 1958. Thus economic and physical factors combine to limit the current carrying capacity of the isolated phase bus system.

The current carrying capacity of an isolated phase bus system of a given physical size may be increased by increasing the cooling rate of the conductors. My novel arrangements consist of forced convection cooling of the conductors.

In one embodiment of my invention a fluid is forced down the center of the hollow conductor of one bus phase and the same fluid is returned through the centers of the conductors of the other bus phases. A second embodiment passes the cooling fluid through the space between the conductor and the housing as well as through the center of the hollow conductor. The fluid may also be circulated in the space between conductor and housing without circulating it through the center of the conductor. In the second embodiment both the inner and outer surfaces of the conductors are in intimate contact with the coolant. However, since the coolant now flows past the insulators which space the conductors from the housing, it is advisable to filter the fluid so that foreign particles will not be deposited on the insulators and eventually short the conductor to the housing. In another embodiment, auxiliary housings are placed over the existing housings and spaced therefrom, with the cooling fluid being forced through the space between the two housings.

By utilizing a closed system for the circulation of the cooling fluid, the use of coolants other than air is economically sound since a closed system permits the recirculation of the same fluid with but a negligible loss from journey to journey through the system. Furthermore, in a closed system, since the coolant is confined within the bus structure it will not pick up foreign particles from the atmosphere and deposit them on the conductor or housing to impede the cooling process or cause electrical breakdown. These other coolants, such as hydrogen have a higher specific heat than air, thus accomplishing a greater heat transfer from the conductor to the fluid with the same rate of fluid flow past the conductors.

These forced convection cooling arrangements enable an existing bus to run at a lower temperature thus reducing the potential drop and heat loss of the bus. In this manner an existing bus structure operating within temperature limits, may have its current carrying capacity increased without an increase in size or weight.

The cooling fluid, having been in intimate contact with the conductor or housing or both has extracted heat from the bus structure and has itself become hot. This warm fluid may be exhausted from the system or may be passed through a heat exchanger, where it is cooled and then recirculated. The heat extracted by the heat exchanger may in turn be utilized for useful purposes.

Accordingly, it is a primary object of my invention to provide a closed forced convection cooling arrangement for isolated phase bus wherein the coolant is forced in a direction parallel to the bus structure and is confined by the bus structure.

Another object is to provide a cooling arrangement wherein the same cooling fluid is used for all phases of the isolated bus structure.

Still another object is to provide a cooling arrangement wherein the fluid is continuously recirculated through the system.

Another object is to provide a forced convection cooling arrangement for a three phase isolated bus system wherein the coolant is forced in a first direction in the one phase and the same coolant is forced in the opposite direction through the remaining two phases.

A still further object is to provide a cooling arrangement wherein the coolant flows through only the center of the hollow phase conductors.

Another object is to provide a cooling arrangement wherein the coolant flows in the space between the conductors and housings.

Another object is to provide a cooling arrangement wherein the coolant flows through the hollow bus conductors and the space between the conductors and housings.

Another object is to provide a cooling arrangement wherein the fluid is introduced at one end of the bus structure and exhausted at the other end of the bus structure.

A further object is to provide a cooling system wherein the bus housing is comprised of an inner and an outer sleeve spaced from each other, with the cooling fluid being forced through the space between sleeves.

Another object is to provide a cooling arrangement wherein the housings of all three phases are positioned within a single outer enclosure with the coolant flowing in the space between the housings and outer enclosure.

These and other objects of my invention will become more apparent after reading the following description in connection with the drawings in which.

Figures 1, 2, 4:
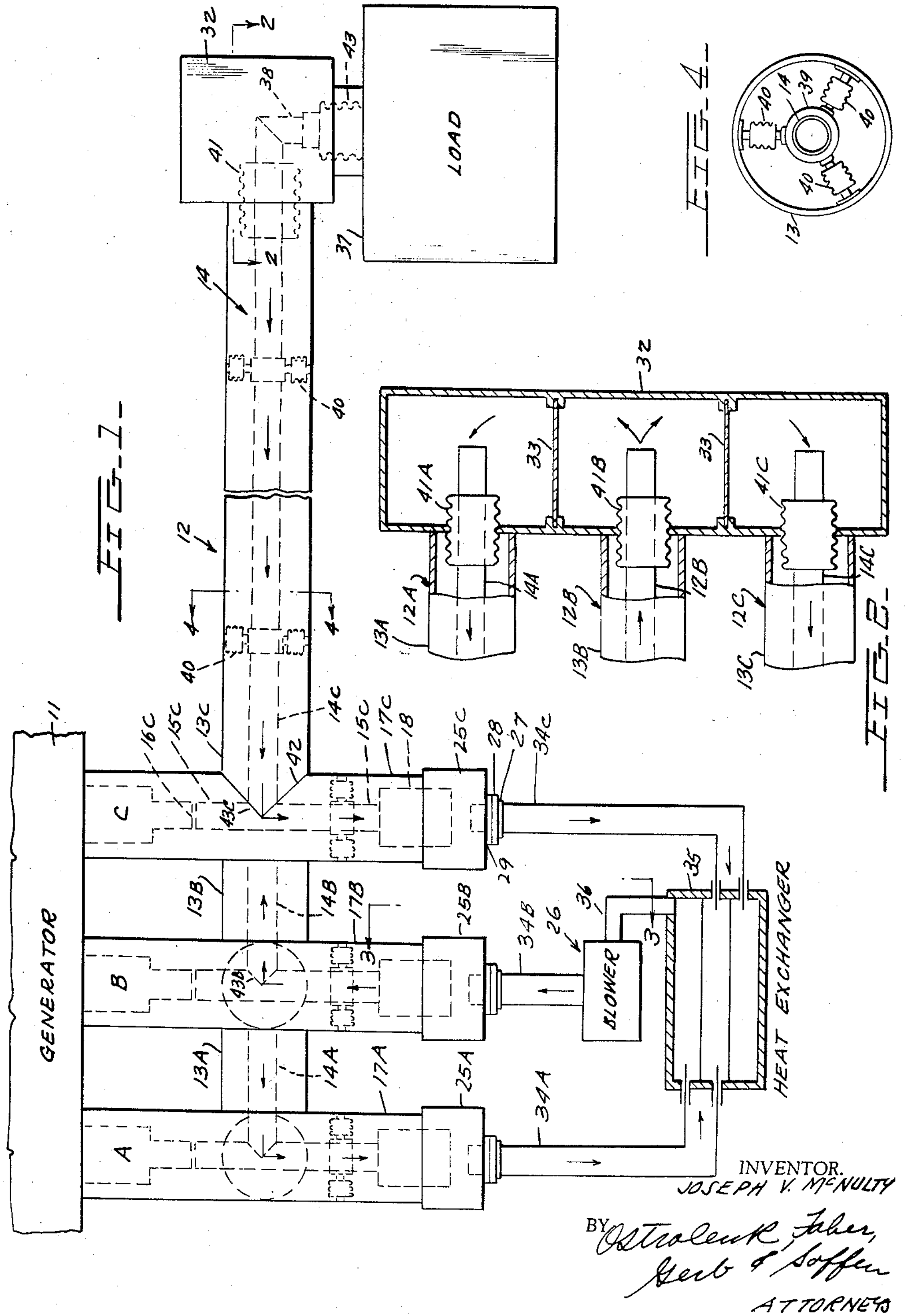
Figure 1 is a side elevation of the first embodiment of my invention.
Figure 2 is a section through line 2—2 of Figure 1 looking in the direction of arrows 2—2.
Figure 4 is a section through line 4—4 of Figure 1 looking in the direction of arrows 4—4.
Figure 3:
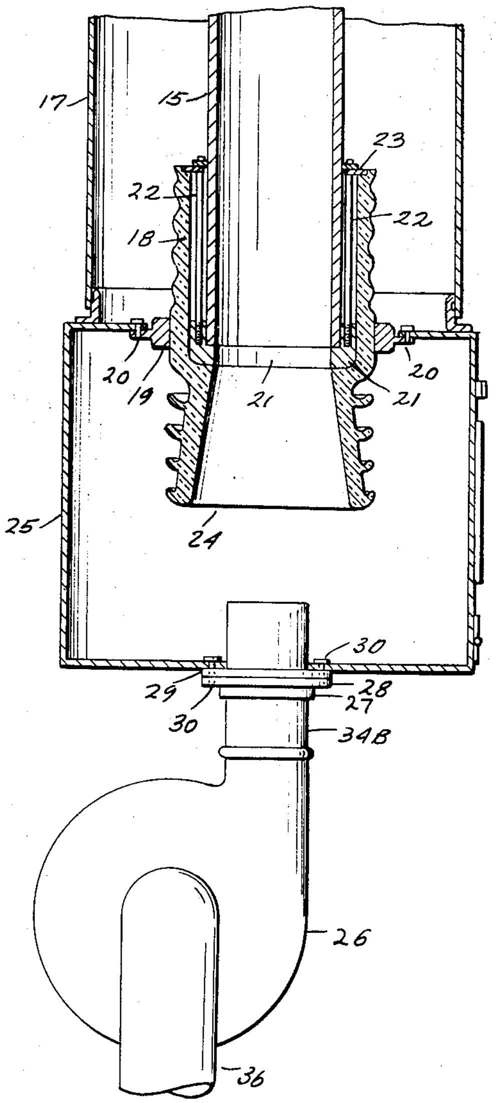
Figure 3 is a section through line 3—3 of Figure 1 looking in the direction of arrows 3—3.

The first embodiment of my novel cooling arrangement is illustrated in Figures 1–4 in which a three phase isolated bus structure 12 is shown electrically connected between a generator 11 and a load 37 which usually is the primary of a main transformer. Each phase of the bus structure 12 is substantially identical in structure to the other phases. Therefore, for the sake of simplicity only one phase shall be described.

Each phase of the isolated bus structure 12 consists of a hollow circular conductor 14 enclosed within a cylindrical housing 13 with the conductor 14 being centered in the housing 13 and insulated therefrom by means of collar 39 and insulators 40. The end of housing 13 nearest the generator 11 is connected at right angles to another housing section 17 by welding or other suitable means, while the other end is secured to the fluid transfer box 32. The end of conductor 14 nearest generator 11 is secured at right angles to hollow conductor 15 by soldering or any other suitable method to form a good electrical connection that is fluid tight. An appropriately shaped opening in conductor 15 provides a continuous passage through the centers of conductors 14 and 15. The other end of conductor 14 projects into fluid transfer box 32 through an appropriate opening. An insulating feed through bushing 41 surrounds conductor 14 as it enters box 32. The bushing 41 is closely fitted to the box 32 and the conductor 14 to form a fluid tight joint. This end of conductor 14 is also electrically connected to load terminal 38 which enters the transfer box 32 through insulating bushing 43 which forms a fluid tight joint..

One end of each of conductors 15A, 15B, 15C is connected to the appropriate generator terminals A, B, C with a solid baffle 16 closing off that end of the conductor 15 to prevent communication between the fluid cooling the bus structure and the fluid cooling the generator. The other end of conductor 15 is received by bushing 18 which is tightly fitted to ring 19, which is in turn secured to housing 25 by screws 20 to form a fluid tight connection. Bushing 18 is fitted with a stationary ring 23 that closely fits the conductor 15 and a moving ring 21 that abuts the end of conductor 15. As studs 22 are tightened, the moving ring 21 is drawn toward the stationary ring 23 and thereby serves to prevent end play of the conductor 15. The housing 17 is secured at one end to the generator 11 and at the other end to housing 25.

A duct 34 connected to the exhaust or output port of blower 26 enters housing 25 opposite the flared end 24 of bushing 18 by means of a fluid tight joint formed by collar 27 having flange 28, gasket 29 and screws 30.

Ducts 34A and 34C are connected to the intake or input port of heat exchanger 35 and duct 34B is connected to the exhaust of blower 26. The exhaust or output port of heat exchanger 35 is connected to the intake or input port of blower 26 through duct 36.

The operation of my novel cooling arrangement will be described as using air for the coolant but hydrogen or any other suitable fluid coolant may be used.

Figures 5, 6:
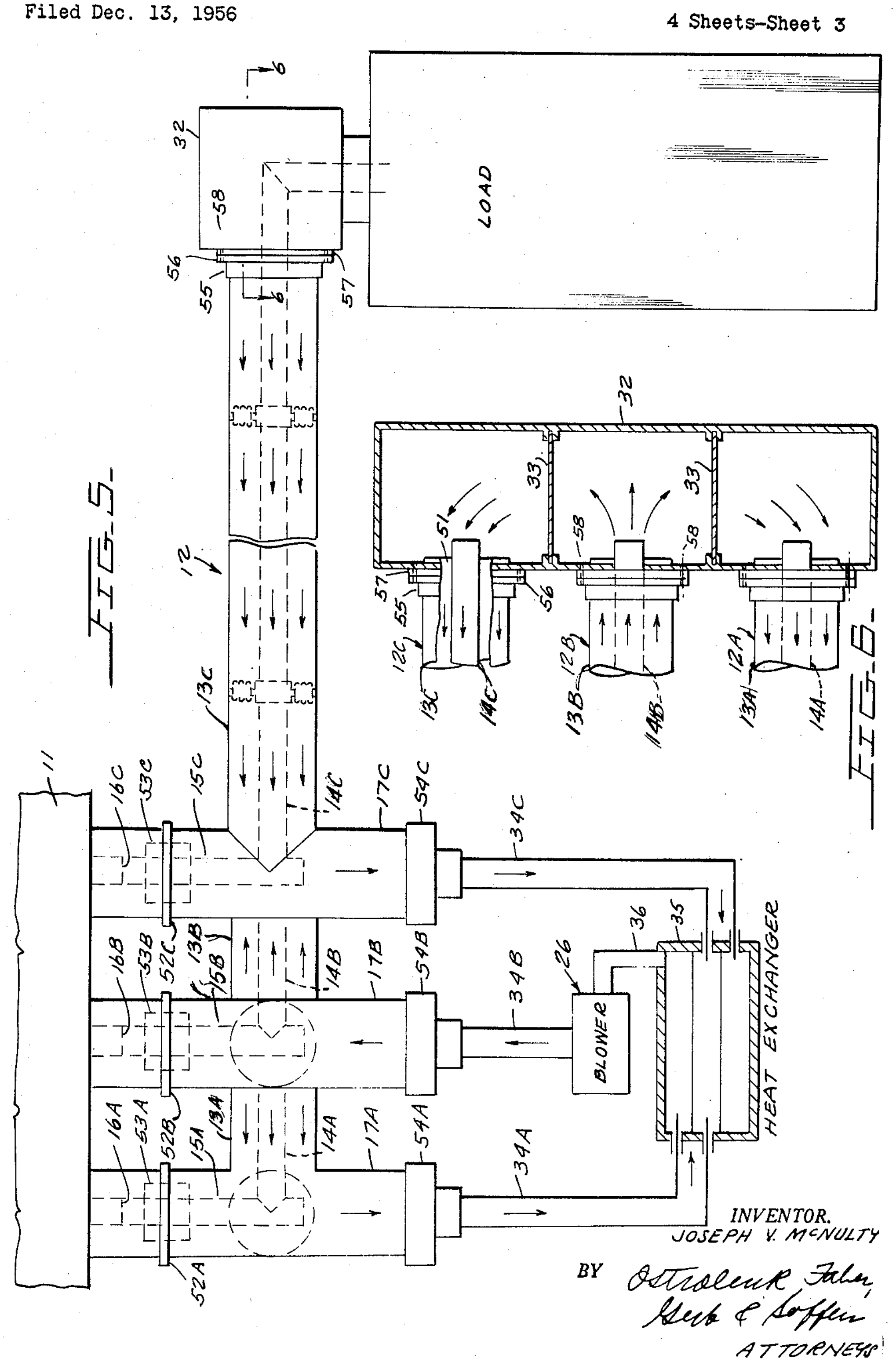
Figure 5 is a side elevation of a second embodiment of my invention.
Figure 6 is a section through line 6—6 of Figure 5 looking in the direction of arrows 6—6.

In operation the blower 26 forces air in the directions indicated by the arrows through duct 34B to housing 25B where the air enters the center of hollow conductor 15B. Baffle 16B blocks the passage at the end of conductor 15B which causes all the airflow to be through opening 43B to conductor 14B, and in the case of a hydrogen cooled generator prevents the escape of the hydrogen. At the load end of conductor 14B the air enters the fluid transfer box 32 where it splits into two paths, passing through filter screens 33 and then through the centers of conductors 14A and 14C. The air is led back to the heat exchanger 35 through conductors 15A and 15C, housings 25A and 25C, and then through ducts 34A and 34C. All this time heat is being transferred from the conductors 14 to the coolant as the coolant passes through the hollow conductors 14. The heated air is now cooled in the heat exchanger 35 and the cooled air is led to the intake of the blower 26 through duct 36 where another journey through the system begins. In the arrangement just described, the same coolant is continously recirculated without any appreciable loss of fluid. My second novel cooling arrangement, illustrated in Figures 5 and 6, is similar to the first embodiment of my invention illustrated in Figures 1–4. The electrical connections from the generator 11 through the isolated phase bus structure 12 to the load 37 are identical. However, the cooling agent is made to circulate through the bus housings 13 as well as the centers of the hollow bus conductors 14 are indicated by the arrows. This arrangement exposes the outer as well as the inner surface of the conductor to the coolant, thus permitting a faster rate of heat exchange.

The housing 25 and the connections thereto have been eliminated and in their place the duct 34 is jointed to housing 17 by means of fluid tight connector 54 which may be made of a resilient elastic type material. At the terminal end of the generator 11 the passage between the conductor 15 and the housing 17 is blocked by bushing 53 surrounding the conductor 15 and the solid baffle 52 which blocks the remaining space. The connection of the housing 13 to the fluid transfer box 32 is made fluid tight by collar 55 having flange 56, gasket 57 and screws 58. Bushing 41 has been eliminated with the conductor 14 being centered in opening 51 of the fluid transfer box by means of insulators 40. In this second embodiment the air is introduced by blower 26 through duct 34B into bus housing 17B where the air also enters hollow conductor 15B. The air is then led through conductor 14B and housing 13B to the fluid transfer box 32 where it splits into two paths and is passed through filter screens 33. After passing through the filters 33, the air enters conductors 14A and 14C and bus housings 13A and 13C to be led back to the blower 26 through conductors 15A and 15C, bus housings 17A and 17C, ducts 34A and 34C, heat exchanger 35 and duct 36.

This arrangement, as did the first, provides a closed recirculating system wherein there is no loss of the coolant. The same fluid is utilized in cooling all phases of the isolated phase bus duct structure 12.

The first and second embodiments of my invention may be modified so as to make them non-recirculating or open systems by providing an opening or exhaust in the portion of the bus structure in the area near the blower that is presently connected to the input port of the heat exchanger, and the heat exchanger may also be eliminated.

Figures 7, 8, 9, 9A:
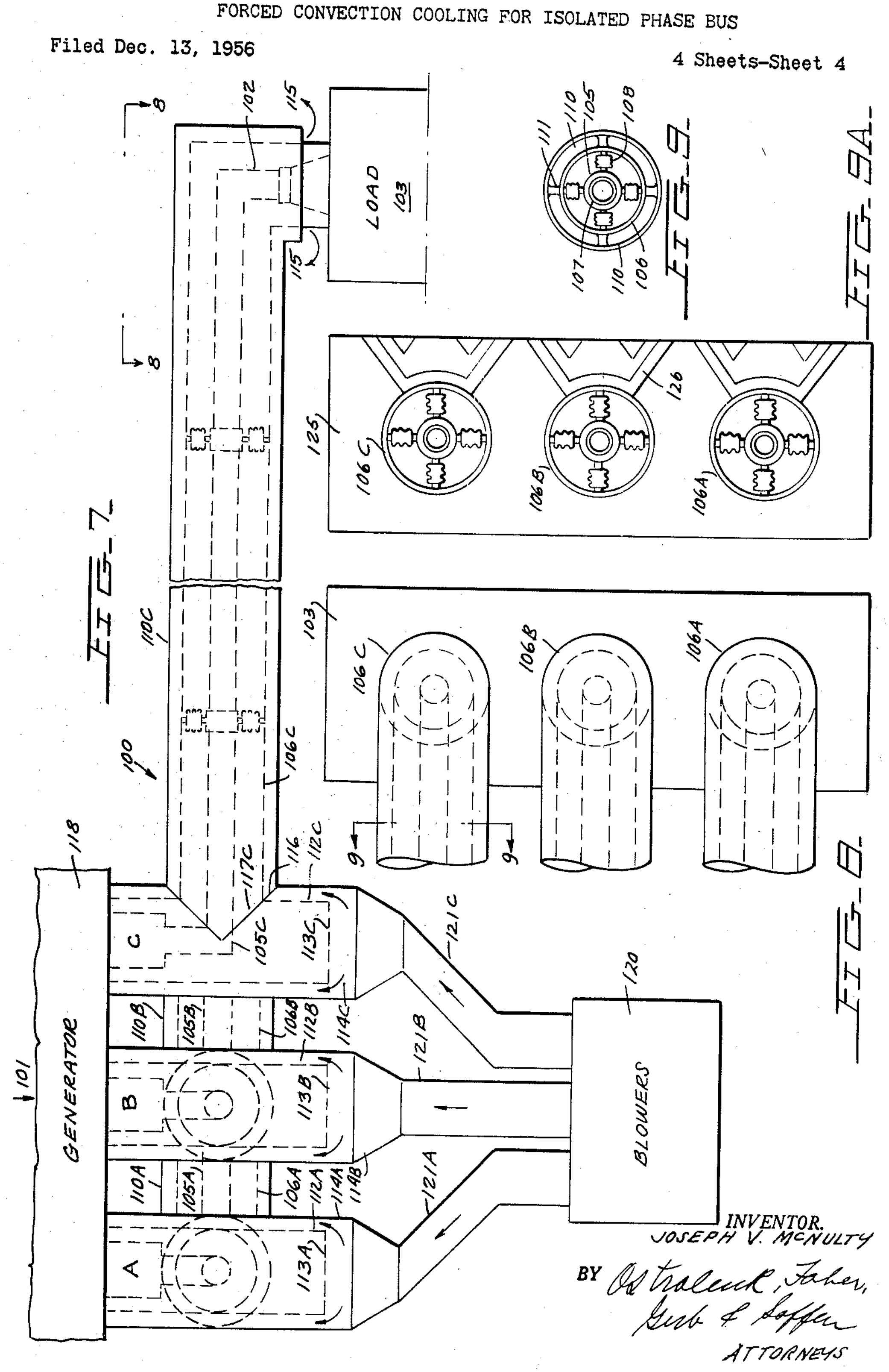
Figure 7 is a side elevation of a third embodiment of my invention.
Figure 8 is a section through line 8—8 of Figure 7 looking in the direction of arrows 8—8.
Figure 9 is a section through line 9—9 of Figure 8 looking in the direction of arrows 9—9.
Figure 9A is similar to Figure 9 showing a variation of the embodiment of Figure 9.

A third embodiment of my invention is illustrated in Figures 7–9. In this arrangement the generator terminals A, B, C, are connected to one end of the bus conductors 105 and the other end of the conductors 105 are connected to the terminals 102 of load 103 to form the electrical path between the generator 101 and the load 103.

Each phase of the isolated phase bus structure 100 consists of a conductor 105 positioned within and insulated from the inner housing 106 by means of collar 107 and insulating standoffs 108. The inner housing 106 is in turn positioned within an outer housing 110 by spacers 111.

The generator end of inner housing 106 is joined at right angles to housing section 112 which is the same size as the inner housing 106. This joint may be welded or otherwise made fluid tight. Hole 117 in housing 112 provides clearance for passage and insulation of conductor 105. One end of housing 112 abuts the generator housing 118 while the other end is covered with cap or baffle 113.

The outer housing 110 is welded or otherwise secured at right angles to another housing section 114 at opening 116 that is as large as the inside diameter of outer housing 110. Housing section 114 is the same size as outer housing 110. Thus a continuous passage is formed in the space between the inner 106 and outer 110 housings and the space between housing sections 112 and 114.

The outlet of blower 120 is connected to one end of housing section 114 through duct 121 while the other end of housing section 114 abuts the generator housing 118 to form a fluid tight connection therebetween.

The cooling fluid is forced by the blowers 120 through the passage between the inner 106 and outer 110 housings and is exhausted at the load end 115. Since the coolant does not flow past the insulating standoffs 108 it is not necessary to provide filter screens to clean the fluid. As the fluid flow is confined in the passage inner 106 and outer 110 housings, heat is transferred from the conductors 105 by convection and radiation to the inner housing 106 and from there to the moving fluid.

As illustrated in Figure 7, the fluid is exhausted into the atmosphere and lost which means that air is the most likely cooling agent. However, suitable return ducts may be added to guide the warm coolant to a heat exchanger and then back to the blower 120. The addition of return ducts and a heat exchanger converts this to a recirculating system where it becomes practical to use hydrogen or some other fluid rather than air as the coolant.

Figure 9A is a modified version of the embodiment illustrated in Figures 7–9. Instead of having a separate outer housing 110 for each inner housing 106 as in Figures 7–9, the embodiment of Figure 9 utilizes a single outer housing or enclosure 125 to surround the three inner housings 106. The housings 106 are mounted within outer housing 125 on cradles 126.

In this embodiment the cooling fluid is circulated in the space between the bus housings 106 and the single outer housing 125.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A closed cycle forced cooled insolated phase bus system having a first, a second and a third phase; each phase comprising a conductor, a housing, and insulator supports, said insulator supports interposed between said conductor and said housing for maintaining said conductor in spaced relationship with respect to said housing; each of said phases having a first end and a second end; a heat exchanger, a blower, a fluid transfer box; said second ends of said phases being entered into said fluid transfer box; said heat exchanger and said blower both including an input and an output port; said blower output port being operatively connected to said first phase; said blower forcing a cooling fluid from said first phase first end through said first phase to said fluid transfer box and from said fluid transfer box through said second and third phases to their said first ends; said second and third phase first ends being operatively connected to said input port of said heat exchanger; said isolated phase bus being geometrically arranged whereby the entire longitudinal portions of said first, second and third phase at said first and second ends respectively are each in one plane with said second and third phase being positioned on opposite sides of said first phase; said output port of said heat exchanger being operatively connected to said input port of said blower.

2. A closed cycle forced cooled isolated phase bus system having a first, a second and a third phase; each phase comprising a conductor, a housing, and insulator supports, said insulator supports interposed between said conductor and said housing for maintaining said conductor in spaced relationship with respect to said housing; said conductors being electrically connected between a generator terminals and a main transformer primary; each of said phases having a first end and a second end; a heat exchanger, a blower, a fluid transfer box; said second ends of said phases being entered into said fluid transfer box; said heat exchanger and said blower both including an input and an output port; said blower output port being operatively connected to said first phase; said blower forcing a cooling fluid from said first phase first end through said first phase to said fluid transfer box and from said fluid transfer box through said second and third phases to their said first ends; said second and third phase first ends being operatively connected to said input port of said heat exchanger; said isolated phase bus being geometrically arranged whereby the entire longitudinal portions of said first, second and third phase at said first and second ends respectively are each in one plane with said second and third phase being positioned on opposite sides of said first phase; said output port of said heat exchanger being operatively connected to said input port of said blower.

3. A closed cycle forced cooled isolated phase bus system having a first, a second and a third phase; each phase comprising a hollow conductor, a housing, and insulator supports, said insulator supports interposed between said hollow conductor and said housing for maintaining said conductor in spaced relationship with respect to said housing, said conductor having a first end and a second end; a heat exchanger, a blower, a fluid transfer box; said second ends of said hollow conductors being entered into said fluid transfer box; said heat exchanger and said blower both including an input and an output port; said blower output port being operatively connected to said first phase hollow conductor; said blower forcing a cooling fluid from said first phase hollow conductor through this conductor to said fluid transfer box and from said fluid transfer box to said first ends of said hollow conductors of said second and third phases through these conductors; said second and third phase hollow conductor first ends being operatively connected to said input port of said heat exchanger; said isolated phase bus being geometrically arranged whereby the entire longitudinal portions of said first, second and third phase at said first and second ends respectively are each in one plane with said second and third phase being positioned on opposite sides of said first phase; said output port of said heat exchanger being operatively connected to said input port of said blower; and means isolating said cooling fluid from the spaces between said conductors and their respective housings.

4. A closed cycle forced cooled isolated phase bus system having a first, a second and a third phase; each phase comprising a hollow conductor, a housing, and insulator supports, said insulator supports interposed between said hollow conductor and said housing for maintaining said conductor in spaced relationship with respect to said housing, said conductor having a first end and a second end; said conductors being electrically connected between a main transformer primary and a generator; a heat exchanger, a blower, a fluid transfer box; said second ends of said hollow conductors being entered into said fluid transfer box; said heat exchanger and said blower both including an input and an output port; said blower output port being operatively connected to said first phase hollow conductor; said blower forcing a cooling fluid from said first phase hollow conductor through this conductor to said fluid transfer box and from said fluid transfer box to said first ends of said hollow conductors of said second and third phases through these conductors; said second and third phase hollow conductor first ends being operatively connected to said input port of said heat exchanger; said isolated phase bus being geometrically arranged whereby the entire longitudinal portions of said first, second and third phase at said first and second ends respectively are each in one plane with said second and third phase being positioned on opposite sides of said first phase; said output port of said heat exchanger being operatively connected to said input port of said blower; and means isolating said cooling fluid from the spaces between said conductors and their respective housings.

5. A closed cycle forced cooled isolated phase bus system having a first, a second and a third phase; each phase comprising a hollow conductor, a housing, and insulator supports, said insulator supports interposed between said hollow conductor and said housing for maintaining said conductor in spaced relationship with respect to said housing, said housing having a first end and a second end; a heat exchanger, a blower, a fluid transfer box; said second ends of said housings being entered into said fluid transfer box; said heat exchanger and said blower both including an input and an output port; said blower output port being operatively connected to said first phase and forcing a cooling fluid through said first phase hollow conductor and housing from said first end to said fluid transfer box and from said fluid transfer box to said first ends of said housings of said second and third phases through their associated housings and conductors; said second and third phase housing first ends being operatively connected to said input port of said heat exchanger; said isolated phase bus being geometrically arranged whereby the entire longitudinal portions of said first, second and third phase at said first and second ends respectively are each in one plane with said second and third phase being positioned on opposite sides of said first phase; said output port of said heat exchanger being operatively connected to said input port of said blower.

References Cited in the file of this patent

UNITED STATES PATENTS

| | | |
|---|---|---|
| 1,866,611 | Affel | July 12, 1932 |
| 2,275,203 | Rudd | Mar. 3, 1942 |
| 2,306,527 | Daniels | Dec. 29, 1942 |
| 2,306,850 | Usselman | Dec. 29, 1942 |
| 2,480,803 | Wreford | Aug. 30, 1949 |